United States Patent [19]

Liptay

[11] 4,287,561

[45] Sep. 1, 1981

[54] ADDRESS FORMULATION INTERLOCK MECHANISM

[75] Inventor: John S. Liptay, Rhinebeck, N.Y.

[73] Assignee: International Business Machines Corporation, Armonk, N.Y.

[21] Appl. No.: 62,200

[22] Filed: Jul. 30, 1979

Related U.S. Application Data

[63] Continuation of Ser. No. 887,093, Mar. 16, 1978.

[51] Int. Cl.³ .............................................. G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,418,638 | 12/1968 | Anderson et al. | 364/900 |
| 3,559,183 | 1/1971 | Sussenguth | 364/200 |
| 3,766,527 | 10/1973 | Briley | 364/200 |
| 4,040,030 | 8/1977 | Cassonnet | 364/200 |
| 4,040,031 | 8/1977 | Cassonnet | 364/200 |

Primary Examiner—Leo H. Boudreau
Assistant Examiner—C. T. Bartz
Attorney, Agent, or Firm—Robert W. Berray

[57] ABSTRACT

In a data processing system which predecodes and queues a plurality of instructions for sequential presentation to an execution unit, and which includes a plurality of instruction-addressable general registers which can be utilized for temporary data storage or source of address modifying information, an interlock mechanism is provided to detect when an instruction is being decoded which requires use of a general register for address modification, but which register has not yet received new data by execution of an instruction awaiting execution in the queue of instructions. Two fields are associated with each instruction awaiting execution in the instruction queue. They identify one or more of the general registers to be loaded with data by execution of the instruction. Compare logic associated with each register of the instruction queue detects when the general registers identified by the fields in the queue include the general register to be used as address modification data by the instruction presently being decoded. Decoding and address formulation are prevented when the compare exists for any instruction awaiting execution in the queue.

4 Claims, 10 Drawing Figures

ADDRESS FORMULATION INTERLOCK MECHANISM

This is a continuation of application Ser. No. 887,093 filed Mar. 16, 1978.

DESCRIPTION

1. Technical Field

This invention relates to predecoding of a plurality of data processing system instructions, and more particularly to preventing address formulation for an instruction using a general register not yet loaded into by a previously decoded, unexecuted instruction.

2. Related Application

Ser. No. 866,686; Filed: Jan. 3, 1978, entitled "Multi-Instruction Stream Branch Processing Mechanism" by J. F. Hughes et al which is assigned to the same assignee as this application which application issued Apr. 29, 1980 as U.S. Pat. No. 4,200,927.

BACKGROUND

The subject invention finds use in a high performance data processing system which functions in accordance with the requirements of IBM System/370 data processing systems as defined by the "System/370 Principles of Operation" Form No. GA22-7000. These data processing systems provide sixteen instruction-addressable general registers. The general registers may be loaded with data for temporary storage, or data stored in the general registers may be utilized for address formulation, which includes utilizing the contents as a base address or address indexing value to be added to address information contained in instructions to be executed.

The above referred to related patent application describes a high-performance data processing system following the IBM System/370 Principles of Operations, and discloses an instruction preprocessing unit which is capable of stacking, or queueing, predecoded instructions to be sequentially transferred to an execution unit for execution, one at a time. In view of the fact that an instruction awaiting execution in the instruction queue may designate a general register to receive new data further decoding of an instruction in an instruction register must be prevented when that instruction requires the use of the same general register for formulating a main storage address.

In the above defined IBM System/370, there are several types of instructions that modify general register contents. All of these define a general register by a field labeled "R1" which identifies the register to be loaded into. The data to be loaded into register R1 may come from another general register, a main storage address location, or from the output of an arithmetic unit. Certain instructions which specify R1 may also imply that the general register R1+1 is also to be loaded.

Some load instructions specify that a plurality of main storage locations are to be accessed and loaded into general registers starting with register R1 and ending with a general register identified by another field in the instruction called R3. This particular instruction is identified as LOAD MULTIPLE.

PRIOR ART

A high-performance system, similar to the one shown in the above referenced related application, is represented by the IBM System/370 Model 168 which includes an instruction preprocessing function for prefetching and predecoding a plurality of instructions to be stacked, or queued, for presentation to an execution unit in sequence, one at a time. This mechanism is described in the "System/370 Model 168III Theory of Operations, Diagrams Manual (Vol. 2), I-Unit", Form No. SY22-6932-3.

In this system, whenever a general register modifying instruction was decoded and entered into the instruction queue, the identity of register R1 was also entered into the instruction queue register along with the instruction execution information to be presented to the execution unit. This information was sufficient to block instruction decoding whenever address formulation information was required from the yet to be executed instruction identifying R1. However, since a LOAD MULTIPLE instruction identifies a range of general registers from R1 to R3, the information concerning R1 was not sufficient to detect when a subsequent instruction being decoded required use of a register beyond that identified by R1. Therefore, in this prior system, whenever a LOAD MULTIPLE instruction was decoded and entered into the instruction queue, further instruction decoding was blocked until the LOAD MULTIPLE instruction was presented to the execution unit and fully executed.

SUMMARY OF THE INVENTION

It was found during the use of the IBM System/370 Model 168III that the LOAD MULTIPLE instruction was utilized more often than anticipated. It can readily be seen that the efficiency of the system is greatly reduced when the predecoding of instruction must be stopped each time a LOAD MULTIPLE instruction has been decoded.

It is a primary object of the present invention to permit predecoding and queueing of instructions subsequent to the decoding and queueing of a load multiple instruction which will modify a plurality of general registers.

It is another object of the present invention to provide address formulation interlock logic generalized enough to accommodate load instructions which identify a single general register, a pair of general registers, or a range of two or more general registers.

These and other objects are achieved by providing two general register identifying fields with each predecoded instruction entered into an instruction queue. Each of the instruction queue register positions has associated compare logic which compares the value in the two fields with general register identifying fields in an instruction being decoded which are to be utilized as base address information or address indexing information. The compare logic is generalized enough, and logic is provided prior to entry of information into the instruction queue, to accommodate the three types of load instructions which identify one, a pair, or range of general registers. Further, the LOAD MULTIPLE instruction may identify a starting general register (R1) which has a higher value than the ending general register (R3). The compare logic is also adapted to provide correct interlock action when this occurs.

BRIEF DESCRIPTION OF DRAWINGS

In the accompanying drawings forming a material part of this disclosure.

DISCLOSURE OF INVENTION

Figure 1:
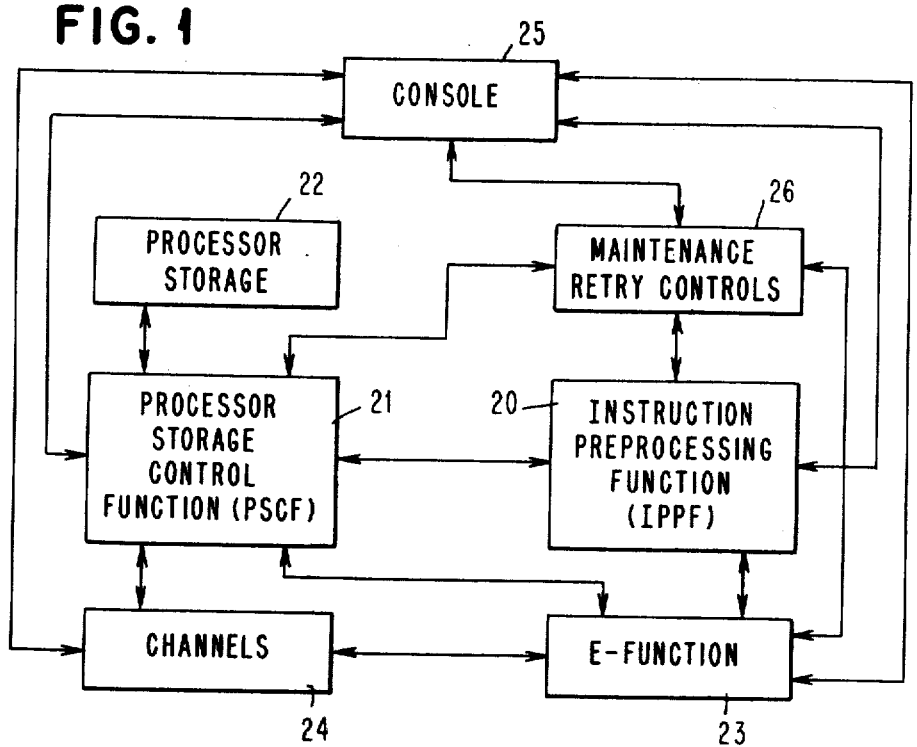
FIG. 1 is a block diagram of the major functional units of a data processing system.

FIG. 1 shows the major functional portions of a high-performance data processing system. The present invention is found in an Instruction Preprocessing Function (IPPF) 20. The IPPF 20 communicates with a Processor Storage Control Function (PSCF) 21, which includes a high speed buffer or cache, to obtain sequences of instructions from Processor Storage 22, and initiate the transfer of data operands to an execution unit or E-Function unit 23. The IPPF 20 also communicates with the E-Function 23 to transfer instructions one at a time, in sequence, to the E-Function 23. Results of instruction executions in the E-Function 23 will be communicated back to the IPPF 20 to provide control to dictate the sequence of instruction execution.

Remaining portions of a data processing system, not pertinent to an understanding of the present invention, include Channels 24, a Console 25, and Maintenance and Retry Controls 26.

Figure 2:
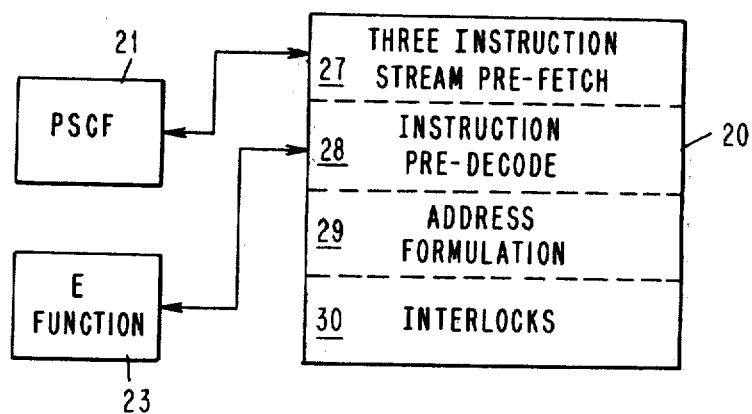
FIG. 2 is a block diagram showing the major functional units of an instruction preprocessing unit.

FIG. 2 depicts four major functional areas within the IPPF 20 of FIG. 1. These include three instruction stream prefetch logic 27, instruction predecode 28, both of which are discussed in detail in the cited related application, address formulation 29, and an interlock mechanism 30, the subject of the present invention. The IPPF 20 has the ability to store, or queue, four predecoded instructions for presentation in sequence, one at a time, to the E-Function 23. This includes information as to data operands to be fetched, general purpose registers to be utilized, starting address information for a microprogram controlled control store, and various other control signals to be more fully described. A great number of the instructions to be decoded require address arithmetic to be accomplished in the IPPF 20 and therefore address formulation logic 29 is provided. A number of interlocks 30 are required to insure that proper data for use in address formulation and instruction predecoding is available prior to entry of decoded instruction information into the four-position queue.

Figure 3:
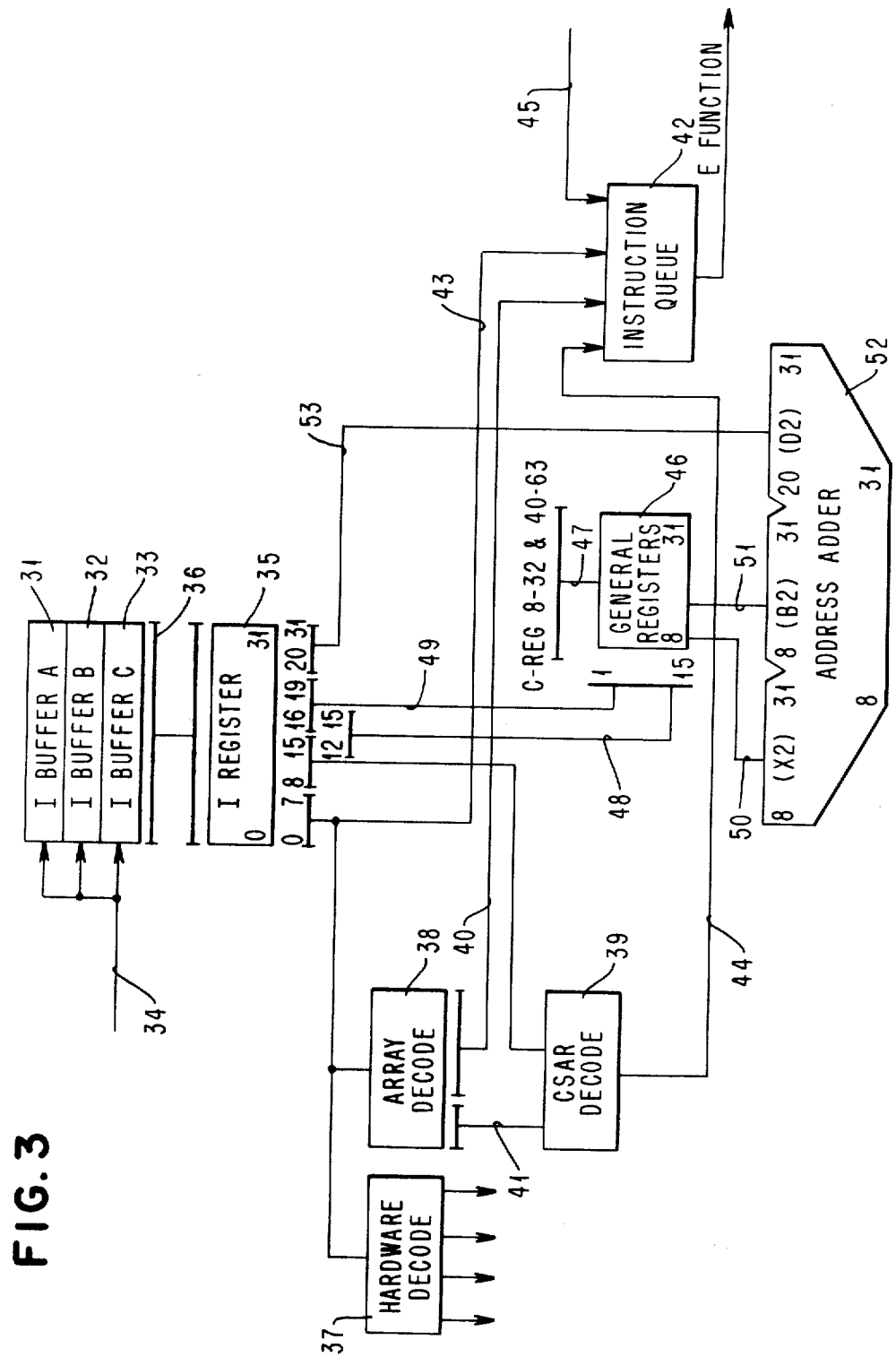
FIG. 3 is a more detailed block diagram of an instruction preprocessing unit showing instruction decoding, address formulation, and an instruction queue.

In FIG. 3, three separate sets of instruction buffer registers, noted generally at 31, 32 and 33, are shown. Each set of instruction buffer registers, when selected, will receive 64 bits of instruction information each time an instruction fetch request is transmitted to the PSCF 21. Therefore, 32 eight-bit bytes of instruction information can be prefetched and stored in each of the sets of instruction buffers 31, 32 or 33.

In the disclosed system, instructions will be decoded one at a time in the IPPF 20. The particular instruction to be decoded in the proper sequence will be transferred to an I-Register 35 which will contain 32 bits of instruction information. Various gates, noted generally at 36, will be energized in accordance with instruction counter address information to transfer the proper one of a plurality of instructions from the one of the instruction buffers currently being utilized during instruction execution to the I-Register 35 for subsequent decoding. The set of gates 36 must accommodate the fact that in the IBM System/360 and System/370 architecture, instructions can be of varying lengths, including two 8-bit bytes, to four or six bytes. Various gate combinations will be enabled to insure that for each instruction to be decoded, the 8-bits of the operation code will be placed in bits 0–7 of the I-Register 35. Depending on the format of the particular instruction being decoded from I-Register 35, bits 8–15 may be mask bits, coded information concerning the length of variable field operands, or addresses of general registers. Bits 12–15 and 16–19 may designate particular ones of sixteen general registers in accordance with address formulation in the System/360 and System/370 architecture. Bits 20–31, of four byte instructions, are an address displacement field entering into the formulation of address information for accessing data operands from storage.

The instruction decoding mechanism of the IPPF 20 includes Hardware Decode 37, Array Decode 38, and Control Store Address Register (CSAR) decode 39. The decoding of each instruction in I-Register 35 requires two clock cycles within the system. During the first clock cycle, certain information concerning the instruction being decoded must be available as quickly as possible and this information is provided through the Hardware Decode 37. Not until the second cycle of each instruction decode is certain other information required and this information is obtained from the Array Decode 38 where the OP-code bits 0–7 are used to address the random access array to provide a plurality of control signal lines 40 and another plurality of control signal lines 41.

The results of the instruction decoding function just discussed are stored as instruction execution control information in one of four registers of an Instruction Queue 42. Part of the execution control information is received on a line 43 which is the 8bits of the OP code indicating the basic function to be performed by the execution unit. In many known microprogrammed control systems, in which a control storage device contains microprograms, the eight OP code bits would be utilized to address the first micro instruction of a sequence of micro instructions to effect execution of the instruction. To enhance the performance of the microprogram control system, additional binary bits utilized for the first cycle of access to the control store are provided on line 44 which have been developed from the CSAR decode 39 which responds to mask information contained in bits 8–15 of the instruction being decoded, and the control signal lines 41 obtained from the Array Decode 38. Additional execution control information is obtained from the Array Decode 38 on line 40. Line 45 represents operand address information obtained from address formulation logic. The execution control information from one of the four registers of the Instruction Queue 42 will be transferred to the E-Function 23 for each execution.

The prefetching of instructions in a particular instruction sequence A, B, or C, into a particular one of the instruction buffers 31-33, continues in parallel with the presentation of a single instruction to the I-Register 35, and presentation of execution control information to an empty one of the four registers of the Instruction Queue 42. A signal from the E-Function 23, indicating completion of an instruction execution by the E-Function 23, will be the signal which gates the next execution control information, in sequence, from one of the four registers of the Instruction Queue 42 to the E-Function for execution. As long as an empty register in the Instruction Queue 42 is available, instruction decoding and entry of execution control information into the empty Queue 42 can proceed.

In addition to the fact that all four registers of the Instruction Queue 42 are full, indicating instruction decoding should be suspended, certain other machine conditions, broadly classified as interlocks, to be more fully discussed, may suspend instruction decoding. Part of the instruction decoding process is the formulation of storage addresses from combinations of address bits contained in each instruction, and the data content of instruction addressable general registers in accordance with the IBM System/360 and System/370 architecture. An interlock, preventing or suspending instruction decode, must be energized if an instruction contained in the Queue 42 has not been executed, and this instruction is to load information into a general register to be utilized for forming an address of an instruction presently contained in the I-Register 35. In this situation, decoding of the instruction in I-Register 35 must be suspended until the information is available from the unexecuted instruction.

The IBM System/360 and System/370 architectures specify instruction addressable general registers. These are normally physically contained and utilized in an execution unit, and such is the case in the system being discussed. However, to speed up address arithmetic, a second copy of the 16 general registers is contained in the IPPF 20. These are shown at 46. The normal path for entering information into the general registers 46, is through a working register labeled "C-REG." in the E-Function 23, and would be entered into the general registers 46 on a line 47. Lines 48 and 69 receive general register address information from the I-Register 35. The outputs of the general registers 46 are applied to an Address Adder 52 along with displacement address bits 20-31 from I-Register 35 along lines labeled 53.

Figure 4:
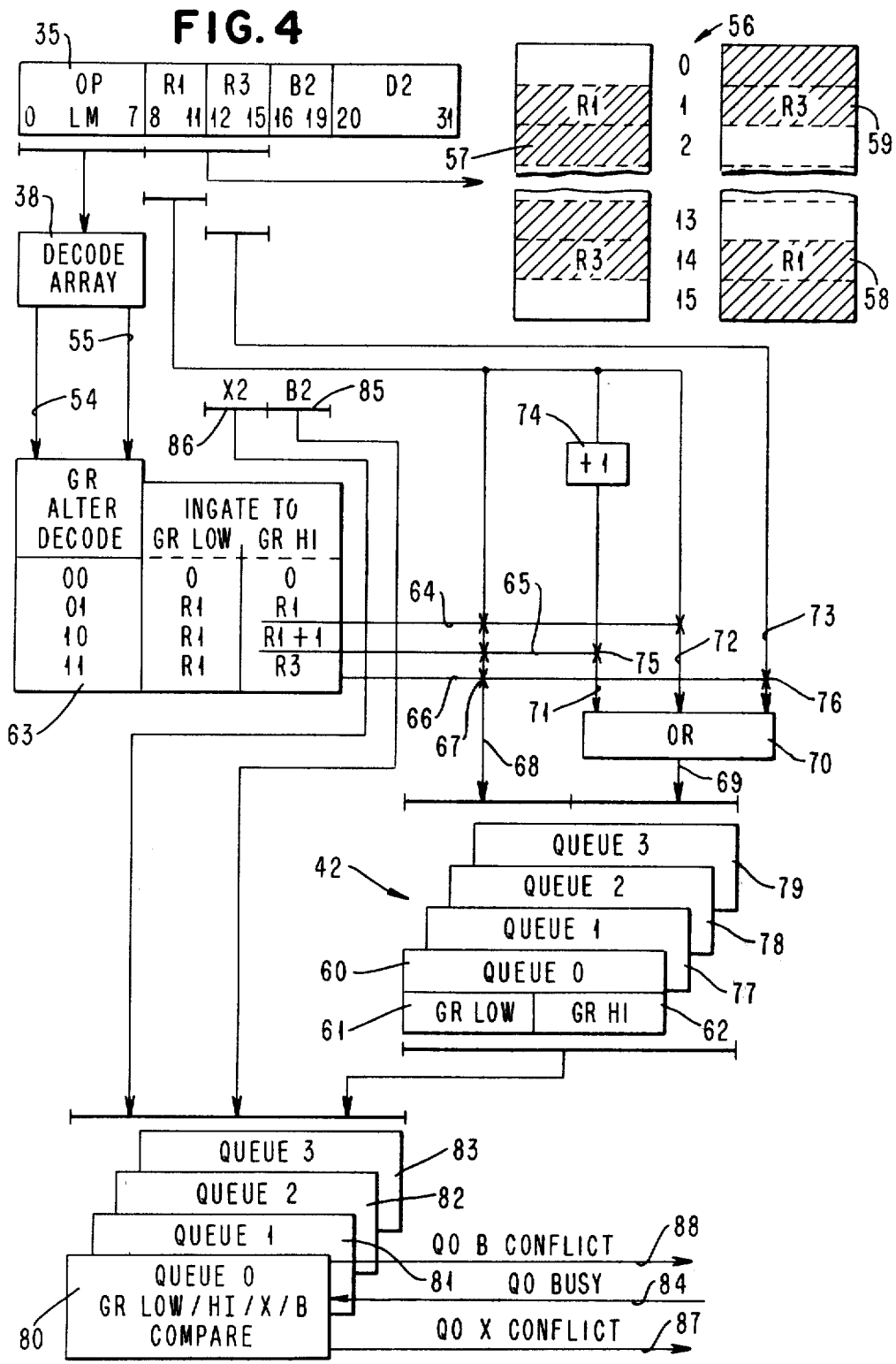
FIG. 4 is a block diagram of the logic required to decode a load instruction for controlling the entry of general register identifying information into proper fields of the instruction queue.

In FIG. 4, there is shown the I-Register 35, decode array 38, and a portion of the instruction queue 42, all referred to previously in FIG. 3. As mentioned previously, part of the instruction decoding process includes presenting the OP code bits 0-7 from the I-Register 35 to the decode array 38 to provide output control signals. Two of these signals are depicted at 54 and 55 and are coded to represent which, if any, of the general registers are to be stored into.

Depicted in the I-Register 35 is the format of a LOAD MULTIPLE instruction (LM). The general registers depicted generally at 56 are to be loaded into beginning with the register designated by the field R1 and continue through, in sequence, to the register identified by the field R3. The main storage address for the first operand to be loaded into register R1 utilize the displacement address bits (D2) which are added to address bits contained in a base register, which is a general register, identified by the field B2. When R1 designates a general register less than or equal to the numerical value of register R3, the loading takes place as represented at 57. It is also possible that the value of field R1 will be greater than the general register designated by R3 such that loading of registers will commence at register R1 shown at 58, and proceed through the last of the general registers to the first of the general registers, and continue to the register R3 shown at 59.

In FIG. 4, only a portion of each of the registers of the instruction queue 42 are shown. For an understanding of the present invention, only that portion of each of the registers is shown which enters into generation of proper address formulation interlocks. A great deal of other instruction execution control information is entered into each of the registers of instruction queue 42 for subsequent presentation to an execution unit. In accordance with the present invention, there is shown at 60, the register representing QUEUE 0. Register 60 includes a four-bit field 61 labeled GR LOW, and a four-bit field 62 labeled GR HI. As instructions are decoded from I-Register 35, the execution control information is placed in one of the registers of the instruction queue 42 in accordance with an inpointer identifying the next empty queue register position. As the information is entered into the particular register, the inpointer is stepped to the next empty queue position and the queue position receiving the execution information has an associated busy trigger turned on indicating that valid information is contained in the queue register.

In response to the control signals 54 and 55 from the decode array 38, a GR ALTER DECODE 63 will provide gate control signals on lines 64, 65, and 66 to indicate decoding of an instruction in the I-Register 35 which will alter the contents of particular general registers. When the control signal lines 54 and 55 have the coded combination 00, no general register will be altered in response to that instruction and therefore the fields 61 and 62 will remain in a reset state showing a value of 0. For the remaining code combinations, the field 61 will always be set to the value of the field R1 through energization of gates represented at 67 to enter the value of R1, by a line 68, into the field 61 of the instruction queue register receiving the decoded information.

The field 62 of the instruction queue register receiving decoded information will be set by an input from a line 69 from an OR circuit 70. OR circuit 70 receives inputs from a line 71, a line 72, or a line 73. Line 72 will present information to the field 62, when a gate is energized by signal line 64, indicating that only register R1 is to be loaded into. Certain other instructions imply that when register R1 is to be loaded into, (always an even numbered register) the next sequential register is also to be loaded into. The value of R1 will be incremented by 1 in an incrementer 74 and presented to OR circuit 70 by a gate 75. Incrementing by 1 only requires forcing the low order bit of R1, (always 0), to a binary 1. For the situation in which a LOAD MULTIPLE instruction has been decoded, a gate 76 will be energized by the signal on line 66 to enter the value of register R3 into the field 62.

Associated with each of the registers 60, 77, 78, and 79 is associated compare circuit 80, 81, 82, and 83. Each of the compare circuits 80 through 83 will be rendered effective by the signal 84 from the associated busy trigger when the queue register position contains valid instruction execution information. To provide the interlock information, the contents of fields 61 and 62 for a busy queue position, are to be compared with any instruction being decoded in I-Register 35 which must perform address formulation utilizing the contents of designated general registers. The fields of instructions which require address formulation are designated as B2 and X2 represented at 85 and 86 respectively. B2 designates a general register containing a base address value, and X2 designates a general register containing an address indexing value, both of which values are to be added to the twelve binary bits of the displacement address in field D2 of the instruction.

Whenever any of the compare circuits 80–83 detect that either the X2 field or B2 field of an instruction being decoded conflicts with values contained in fields 61 and 62 of any of the instruction queue registers, a signal on line 87 or 88 for the associated compare circuit will be generated to signal the conflict.

Figure 5:
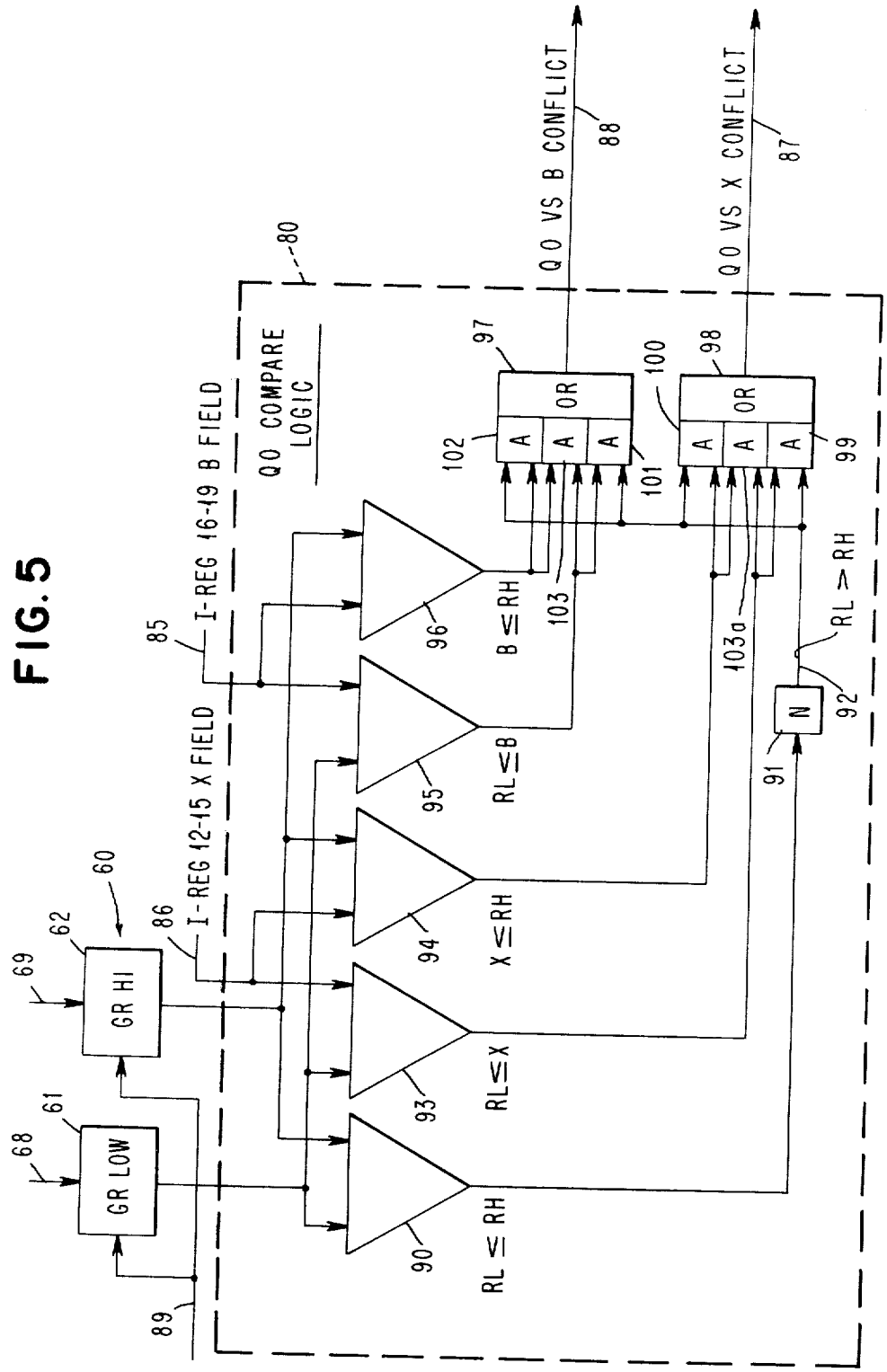
FIG. 5 is a logic diagram of a compare circuit receiving inputs from the general register identifying information of an instruction queue and fields of an instruction being decoded.

Further details of compare circuit 80 associated with Queue 0 register 60 is shown in FIG. 5. When decoding of an instruction has been completed and the information is to be entered into the instruction queue, the information will be entered into the instruction queue position signalled by the decoded value of the inpointer on line 89 associated with the instruction queue 42 of FIG. 3. The value of R1 will be entered into field 61, and field 62 will receive either R1, R1+1, or R3. The four-bit X field, and B field, will be presented to the compare circuit on lines 85 and 86 to be compared with fields 61 and 62 of all instruction queue register positions.

The function of the compare logic 80 is to detect those situations in which the general register identified by either the X or B field of an instruction being decoded falls within the shaded area depicted at 56 in FIG. 4. As shown at 56 in FIG. 4, two different situations arise depending on the value of R1 and R3. A compare circuit 90 receives these values, and through an inverter 91, provides a signal at 92, the binary state of which will distinguish between the situations where R1 is greater than or less than R3. Remaining compare circuits 93 through 96 compare the R1 and R3 values, contained in GR LOW (61) and GR HI (60) respectively, with the values of the X field and B field, providing an output signal indicating when the particular values are less than or equal to the other value. OR circuits 97 and 98 provide signals indicating the conflict situation. When R1 is greater than R3, indicated by a positive output signal on line 92, AND circuits 99, 100, 101 and 102 will signal a conflict between the B field or X field with the shaded area 58 or 59 in FIG. 4. AND circuits 103 and 103a will show a conflict when these fields are within the shaded area 57 of FIG. 4.

Figure 6:
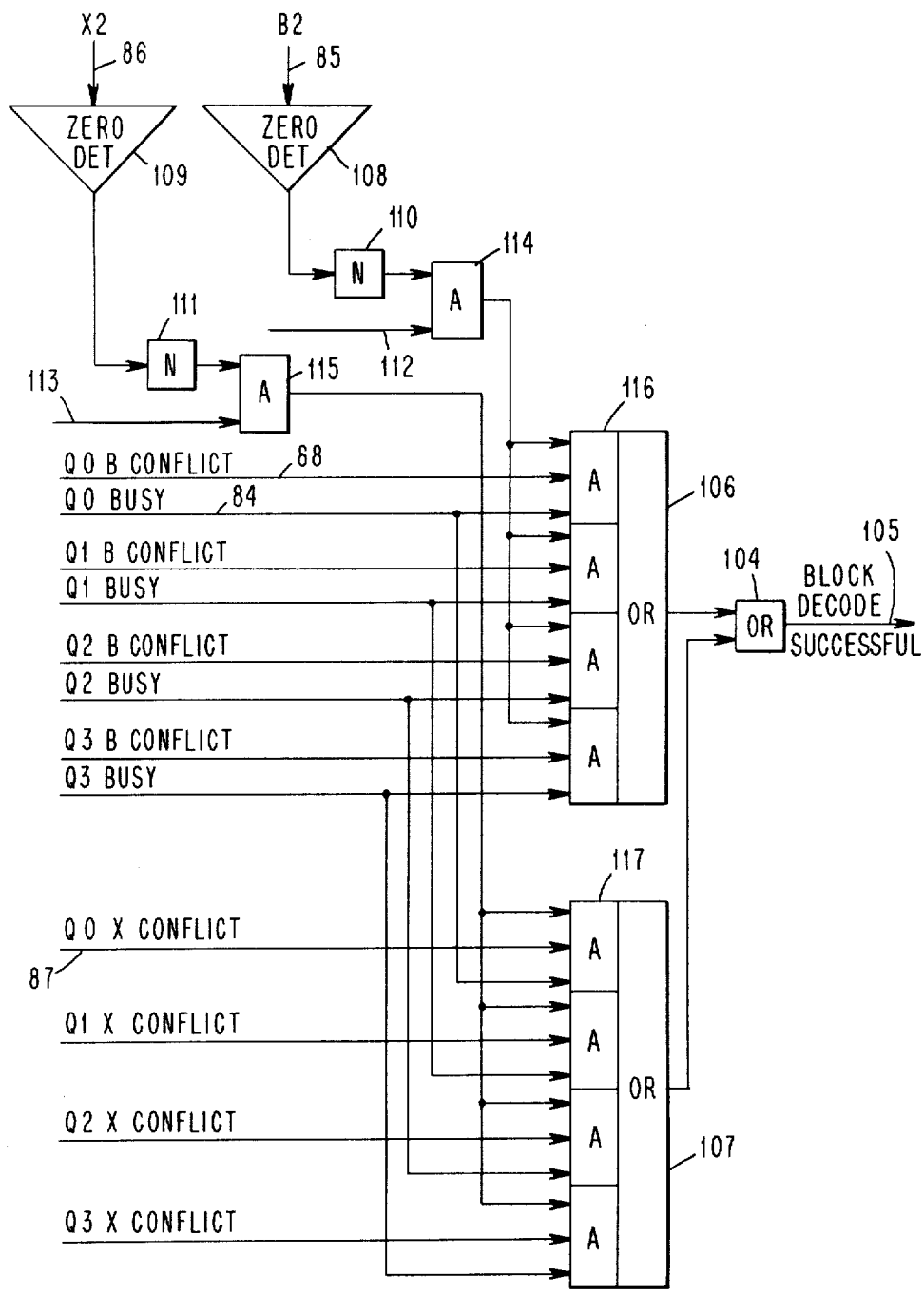
FIG. 6 is a logic diagram responding to a conflict between general register fields in the instruction queue and general register fields in an instruction to be decoded for blocking further decoding.

FIG. 6 shows the ultimate purpose of the present invention. That is, an OR circuit 104 will provide an output signal 105 when a conflict situation exists. The signal 105, labeled BLOCK DECODE SUCCESSFUL, prevents complete decoding of the instruction in the I-Register 35 of FIG. 3. The instruction in the instruction queue 42 which has created the conflict must be fully executed and cleared from the instruction queue before decoding of the instruction in I-Register register 35 may be started again. OR circuit 106 will provide an output signal whenever there is a conflict involving the B2 field, and OR circuit 107 will indicate a conflict with the X2 field.

Although any one of the compare circuits 80 through 83 may provide a signal indicating a conflict, two additional conditions must be met before the conflict situation is recognized as one requiring the blocking of further instruction decoding. The first of these conditions involves the IBM System/370 architectural definition which permits the B2 field and X2 field to contain the value 0 indicating that the field does not designate a general register to participate in address formulation. Therefore, zero detect logic 108 and 109, through associated inverters 110 and 111, indicate whether or not either of these fields contain a zero value.

A second condition which must be met is indicated on lines 112 and 113 which are further control signal outputs from decode array 38 of FIG. 3. These lines indicate that the instruction being decoded in I-Register 35 has a format in which there is a B2 field or X2 field respectively. When these two further conditions have been met, AND circuits 114 and 115 will enable a series of AND circuits noted generally at 116, and 117 respectively. Each of the AND circuits 116 or 117 has an additional two inputs indicating that the associated queue is busy (84) and that the compare circuit of the associated queue is signalling a conflict (87, 88).

Figure 7:
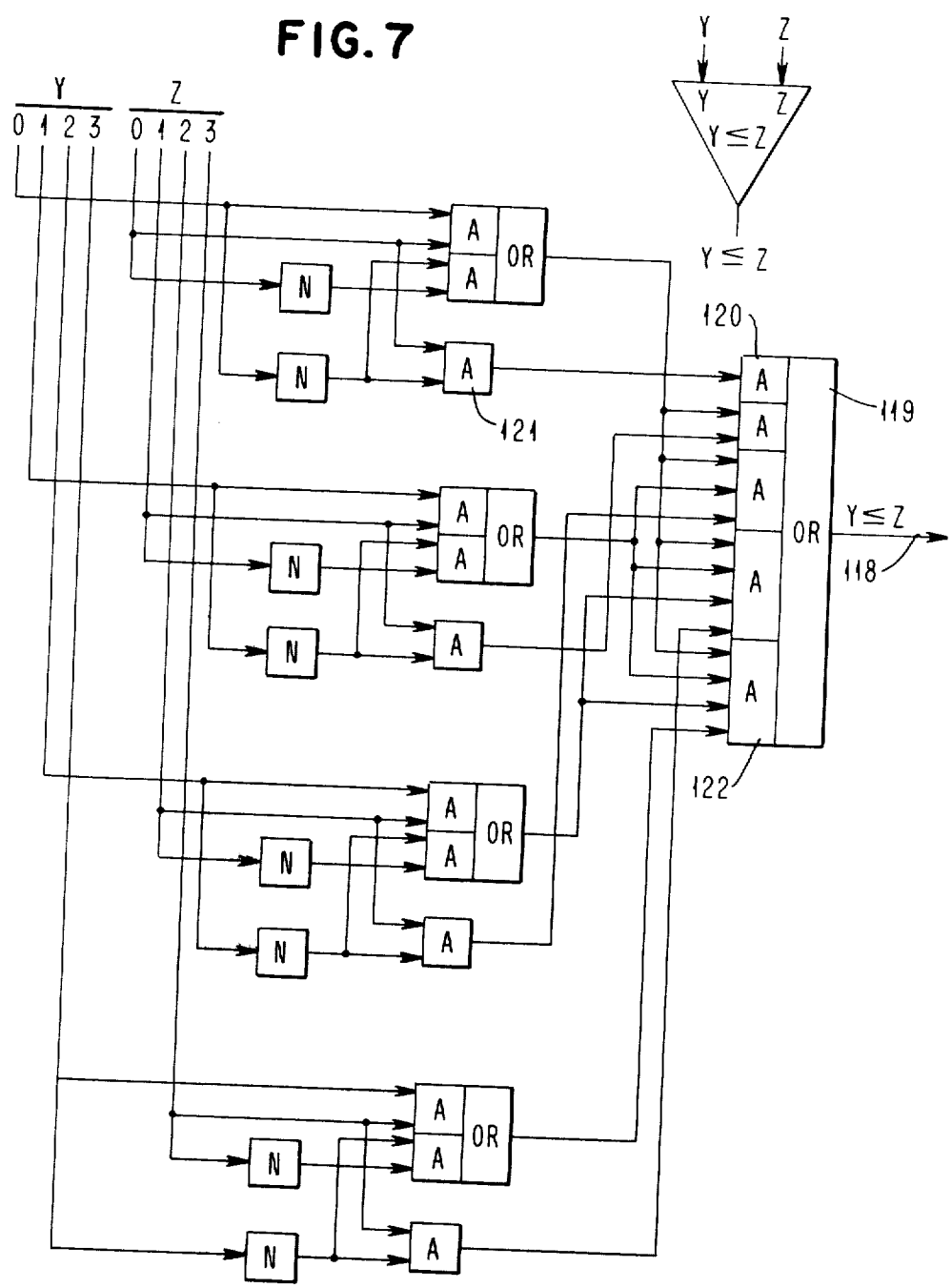
FIG. 7 is a detailed logic diagram of a compare circuit for generating a signal indicating that one binary number is equal to or less than another binary number.

FIG. 7 shows detailed logic of each of the compare circuits 90, 93, 94, 95, and 96 shown in FIG. 5. A positive output signal 118 will be produced from an OR circuit 119 when any of the AND circuits shown feeding OR circuit 119 is enabled. For example, AND circuit 120 will provide a positive signal to OR circuit 119 when provided with a positive signal from AND circuit 121. AND circuit 121 signals the situation in which the high order bit position 0 of the Z field is a binary 1, and the high order bit position 0 of the Y field is a binary 0. This indicates that Y is less than Z. Each of the other AND circuits providing an input to OR circuit 119 detects when the higher order binary bits of the Y and Z fields are equal, but the next lower order binary bits indicate that Y is less than Z. Finally, AND circuit 122 provides an output when the value of the Y field equals the value of the Z field.

Figure 8:
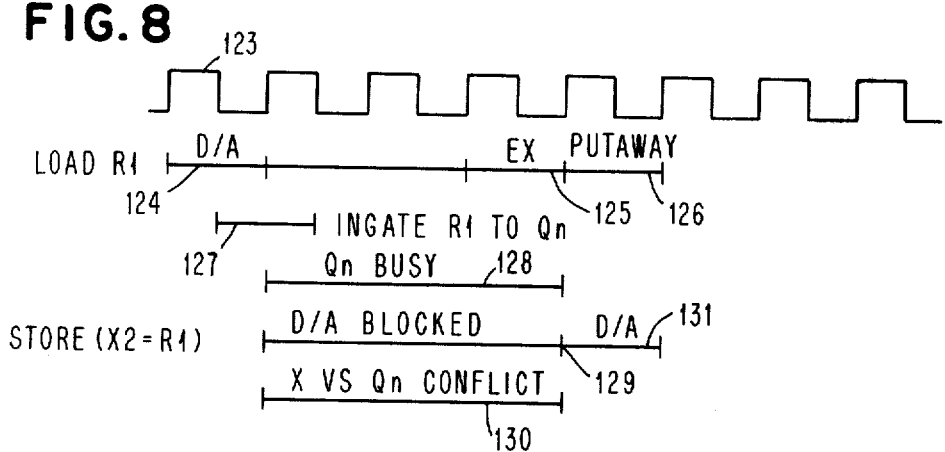
FIGS. 8, 9 and 10 are timing diagrams explaining the difference between prior art interlock logic and the interlock logic of the present invention.
Figure 9:
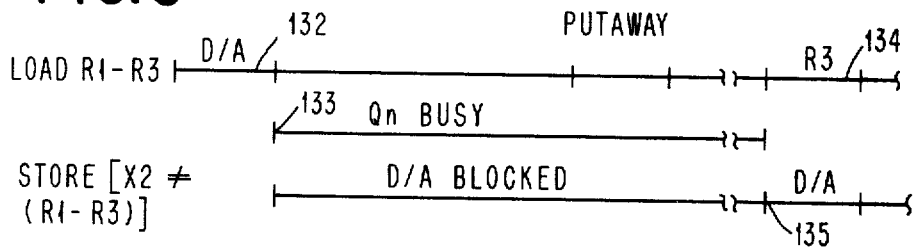
Figure 10:
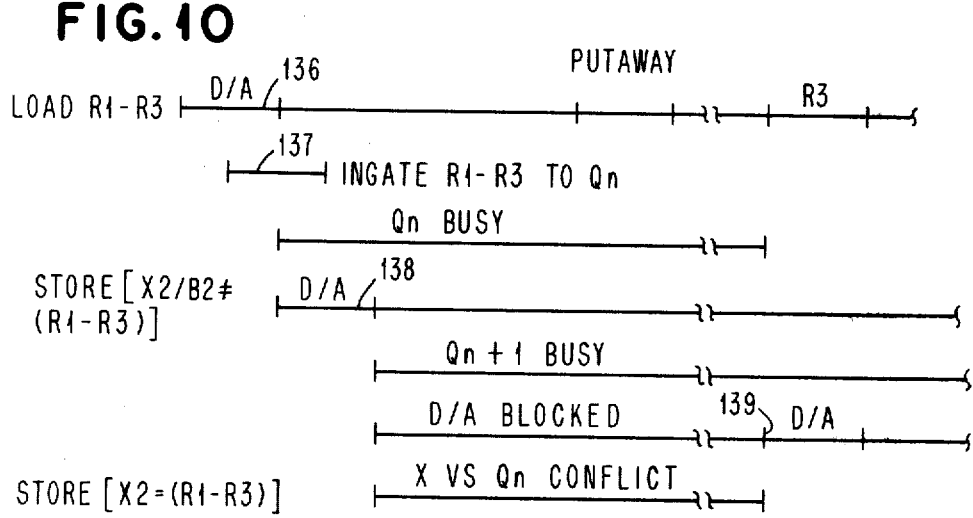

FIGS. 8, 9 and 10 are timing diagrams explaining the difference between the present invention and the prior art with regard to generation of signals to block instruction decoding when conflicts exist between the requirement to use the contents of a general register which has not yet been loaded into from a previous instruction. In FIG. 8, waveform 123 shows the timing of a machine cycle. The timing is such that when an instruction is being decoded, the decode and address arithmetic can be accomplished in one machine cycle as shown at 124. FIG. 8 shows the decoding of a LOAD instruction in which general register R1 is to be modified. Storage access timing is such that the instruction will be completed at 125 with the data being inserted into register R1 at 126. The value of R1 is ingated at 127 to the queue position pointed to by the inpointer, herein designated Qn. The busy trigger associated with Qn is turned on at 128. Instructions can be decoded at a rate in which one is decoded and address arithmetic accomplished in each cycle of the system. As shown in FIG. 8, when the STORE instruction is being decoded, and the X2 field is shown to equal R1, decoding is blocked until the instruction has been cleared from the Qn at point 129. At this time the conflict shown at 130 is removed and decoding and address arithmetic for the STORE instruction can take place at 131.

FIG. 9 depicts the situation where a LOAD MULTIPLE instruction designating R1 and R3 is decoded at 132. Qn is indicated at busy at 133 and, in accordance with the prior art, the recognition of the LOAD MULTIPLE instruction causes decoding and address arithmetic to be blocked, even though subsequent instructions to be decoded utilize X or B fields which do not equal R1-R3. Not until the final put away of data into R3 and 134 may the decode and address arithmetic for the subsequent instruction take place at 135.

In accordance with the present invention, FIG. 10 depicts the capabilities of the data processing system when a LOAD MULTIPLE instruction is decoded at 136 with ingating of the R1 and R3 fields to queue position Qn shown at 137. Queue position Qn is indicated as being busy as before. In accordance with the present invention, the decode and address arithmetic for a subsequent instruction is allowed to proceed at 138 when neither the X2 field or B2 field is in the range of the values of R1-R3. The decoding and address arithmetic proceed and the instruction control information is transferred to instruction queue position Qn+1 as indicated by the inpointer. If decode of a next instruction, such as a STORE, which requires an X2 field which does equal one of the general registers in the range R1-R3, then conflict with queue position Qn is indicated, and decoding and address arithmetic for that instruction will be blocked until the time shown at 139 when Qn is no longer busy.

It can be seen in connection with FIGS. 9 and 10 that with the present invention, decode and address formulation for an instruction following a LOAD MULTIPLE instruction can proceed at 138 when the X and B fields do not equal registers R1-R3. In the prior art, decode of the same STORE instruction could not occur until after complete execution of the LOAD MULTIPLE instruction as shown at 135 in FIG. 9.

While the invention has been particularly shown and described with references to a preferred embodiment thereof, it will be understood by those skilled in the art that changes in form and details may be made therein without departing from the spirit and scope of the invention.

Having thus described my invention, what I claim as new, and desired to secure by Letters Patent is:

1. In a data processing system having overlapped instruction execution and instruction decoding including: (1) a memory having a plurality of addressable locations, each location adapted to store either instructions or data; (2) an instruction preprocessing unit; (3) a plurality of addressable general registers; (4) an execution unit and; (5) means interconnecting said various units, said instruction preprocessing unit including, a program counter connected to the memory for addressing the memory, said memory connected to an instruction register, to access instructions in sequence for transfer to the instruction register, a normally operative decoder connected to the instruction register for decoding various fields of an instruction, each instruction including an OP code field specifying an operation to be performed, at least two general register address fields providing designation of, and access to, the general registers, with certain of the instructions including a data address field providing part of the address information required to address a memory location of data, the decoding process for a data accessing instruction including the combining of the data address field in an instruction with the information content of one or more general registers identified by one or more general register address fields of the instruction, an instruction which may be of the type called a general register modifying instruction when executed by the execution unit would include the transfer of new data to at least one general register, and a plurality of queue registers in the preprocessing unit comprising a first-in/first-out buffer connected to the output of the decoder, wherein as the decoding of each instruction in the instruction register is completed, signals, partially developed from the OP code field of the instruction, representing execution control information required by the execution unit are stored in one of said queue registers, and execution control information is transferred from the queue registers to the execution unit, one at a time, and on demand by the execution unit, each queue register having an associated busy trigger which is set when execution control information is received, and reset when the execution unit completes execution of the instruction represented by the execution control information, improved interlock logic in associated with the instruction preprocessing unit for blocking operation of the instruction decoder comprising:

first (61) and second (62) general register identifying fields included as part of, and completing the development of execution control information in, each of said plurality of queue registers (60, 77, 78, 79);

gate means (63 through 76), operative at the completion of decoding of a general register modifying instruction, for transferring the one or more general register address fields identifying said at least one general register from said instruction register to said first and second general register identifying fields of the queue register which is associated with the execution control information developed in conjunction with that particular instruction, and having a busy trigger reset, as part of the execution control information, a plurality of compare means (80, 81, 82, 83) one for each of said first and second general register identifying fields of each of said queue registers;

means (85, 86) connecting the one or more general register address fields of a data accessing instruction from the instruction register to all of said plurality of compare means; and correspondence signalling means (104), connected and responsive to all said compare means for signalling (105) correspondence between a general register address field in a data accessing instruction and said first and second general register identifying fields in any of said queue registers, thereby indicating that the execution unit has not yet received from said queue registers, and executed, the execution control information of a previously decoded general register modifying instruction, said correspondence signalling means being connected to the normally operative decoder to inhibit further operation of the decoder.

2. A data processing system in accordance with claim 1, wherein:

said first and said second general register identifying fields are equal in response to decoding of a first type of general register modifying instruction;

said second general register identifying field is a modified value of said first general register identifying field in response to decoding of a second type of general register modifying instruction; and said first and said second general register identifying fields are derived from two different general register address fields of a third type of general register modifying instruction.

3. A data processing system in accordance with claim 1 wherein each said compare means includes:
- first compare logic for providing a signal indicating the relative value of said first and second general register identifying fields;
- second compare logic for providing a signal indicating the relative value of said first general register identifying field and said general register address fields from the instruction register;
- third compare logic for providing a signal indicating the relative value of said second general register identifying field and said general register address fields from the instruction register; and
- logic means, connected and responsive to the signals from said first, second, and third compare logic for providing a conflict signal.

4. A data processing system in accordance with claim 3 wherein said correspondence signalling means includes:
- enabling means, responsive to the instruction register and decoder, for providing an enabling signal indicating the instruction in said instruction register is a data accessing instruction; and
- block decode signalling means, connected and responsive to said enabling signal, said conflict signal from any of said compare means, and a signal from the busy trigger of the queue register associated with said compare means providing said conflict signal.

* * * * *